United States Patent [19]

Dalton, Jr. et al.

[11] 4,421,531
[45] Dec. 20, 1983

[54] ADIABATIC PRESSURE SWING ABSORPTION PROCESS FOR REMOVING LOW CONCENTRATIONS OF OXYGEN FROM MIXED GAS STREAMS

[75] Inventors: Augustine I. Dalton, Jr., Allentown, Pa.; John J. Sheridan, III, Somerville, N.J.; David A. Zagnoli, Fleetwood, Pa.

[73] Assignee: Air Products and Chemicals, Inc., Allentown, Pa.

[21] Appl. No.: 417,297

[22] Filed: Sep. 13, 1982

[51] Int. Cl.³ .............................................. B01D 53/04
[52] U.S. Cl. ........................................... 55/26; 55/62; 55/66; 55/74; 423/219
[58] Field of Search .................. 55/18, 25, 26, 58, 62, 55/66, 68, 74, 75; 423/219, 262, 579

[56] References Cited

U.S. PATENT DOCUMENTS

| | | | |
|---|---|---|---|
| 2,450,276 | 9/1948 | Fogler et al. | 423/219 X |
| 2,523,549 | 9/1950 | Axe | 423/219 X |
| 2,810,454 | 10/1957 | Jones et al. | 55/66 X |
| 2,874,030 | 2/1959 | Dennis | 423/219 X |
| 2,909,410 | 10/1959 | Fedorko | 423/219 X |
| 2,944,627 | 7/1960 | Skarstrom | 55/62 X |
| 3,055,732 | 9/1962 | Delassus et al. | 423/219 |
| 3,176,444 | 4/1965 | Kiyonaga | 55/62 X |
| 3,237,379 | 3/1966 | Kant et al. | 55/62 X |
| 3,323,288 | 6/1967 | Cheung et al. | 55/62 X |
| 3,361,531 | 1/1968 | Erb et al. | 423/219 |
| 3,430,418 | 3/1969 | Wagner | 55/62 X |
| 3,636,679 | 1/1972 | Batta | 55/62 X |
| 3,960,769 | 6/1976 | Munzner et al. | 423/579 X |
| 3,969,481 | 7/1976 | Murray et al. | 423/219 |
| 3,980,763 | 9/1976 | Mullhaupt | 423/219 X |
| 3,986,849 | 10/1976 | Fuderer et al. | 55/25 |
| 3,996,028 | 12/1976 | Golovko | 55/58 |
| 4,011,306 | 3/1977 | Fox, Jr. | 423/579 |
| 4,025,605 | 5/1977 | Dalton, Jr. et al. | 423/240 |
| 4,026,680 | 5/1977 | Collins | 55/26 |
| 4,032,617 | 6/1977 | Gay | 423/579 X |
| 4,077,780 | 3/1978 | Doshi | 55/26 |
| 4,194,892 | 3/1980 | Jones et al. | 55/58 |
| 4,203,958 | 5/1980 | Snarski | 423/351 |
| 4,234,322 | 11/1980 | Meyer et al. | 55/18 |
| 4,239,509 | 12/1980 | Bligh | 55/66 |
| 4,299,719 | 11/1981 | Aoki et al. | 252/188 |
| 4,366,085 | 12/1982 | Ikegami et al. | 423/219 X |

*Primary Examiner*—Robert H. Spitzer
*Attorney, Agent, or Firm*—Geoffrey L. Chase; E. E. Innis; J. C. Simmons

[57] ABSTRACT

An adiabatic pressure swing absorption process is disclosed for the removal of essentially all oxygen contained in an inert gas stream in minor amounts. The oxygen is absorbed and desorbed adiabatically from a dioxygen sorbent. Optionally, an inert purge gas can be utilized to improve the desorption of oxygen from the dioxygen sorbent. The process utilizes at least two switching beds of the dioxygen sorbent in which one bed is in an absorbing mode while the other bed is in a desorbing mode.

19 Claims, 3 Drawing Figures

EQUILIBRIUM OXYGEN ISOTHERMS FOR FLUORAMINE

ADIABATIC PRESSURE SWING ABSORPTION PROCESS FOR REMOVING LOW CONCENTRATIONS OF OXYGEN FROM MIXED GAS STREAMS

TECHNICAL FIELD

The present invention is directed to a process for the purification of inert gases such as nitrogen or argon. More particularly, the invention is concerned with the removal of minor concentrations of oxygen from impure inert gas streams. Typically, such an impure inert gas stream could be an oxygen containing argon stream from a cryogenic air separation process.

BACKGROUND OF THE PRIOR ART

The removal of oxygen from inert gas streams such as impure argon or impure nitrogen is impractical when exceedingly low concentrations of oxygen are present in such inert gases. Conventional purification or separation techniques such as cryogenic distillation, pressure swing adsorption and vacuum swing adsorption are impractical for the removal of minor or trace quantities of oxygen from a major gas stream. The commercial removal of oxygen in minor quantities in inert gases, such as argon, face severe limitations, such as unfavorable economies of scale, limiting physical laws of thermodynamic equilibria and the impaired reversibility of prior art chemical processes for extracting the trace quantities of oxygen from major gas streams.

For instance, the removal of trace oxygen by the Deoxo process can only be practically achieved on a large scale. The prior art Deoxo process involves the removal of oxygen from argon by the reaction of the oxygen with added hydrogen over a catalyst. The gas must then be dried of the resulting water and excess hydrogen must be separated from the product gas stream. Because of the difficulty and expense in performing these diverse operations, the Deoxo process has only been utilized in a centralized manner in which various sources of oxygen-containing inert gas or argon have been shipped to a central processing plant for later redistribution.

Cryogenic separation techniques are exceedingly unfavorable for the removal of trace amounts of oxygen from argon in light of the particularly low temperatures necessary for such a separation as well as the close boiling points of such gases as oxygen and argon. This is exemplified in the commercial environment wherein few air separation facilities provide substantially pure, oxygen-free, argon.

The prior art has utilized physical absorbents such as molecular sieve beds for the removal of oxygen from inert streams such as argon or nitrogen. However, the physical adsorption technique is dependent upon thermodynamic equilibria. This approach therefore is relevant only to mixed gases wherein high concentrations of the impurity gas, i.e. oxygen, exists and minor or trace amounts of impuritiy gases in the separated components can be tolerated.

The use of Salcomine, a dioxygen absorbent, for the production of oxygen as a product from air is taught in U.S. Pat. No. 2,450,276. The patent describes a process in which heat and vacuum are necessary to desorb the product oxygen from the Salcomine absorbent. In U.S. Pat. No. 2,523,549, Salcomine is used to remove oxygen from a hydrocarbon stream. The Salcomine is utilized in beds for alternating absorption duty. The patent teaches that the beds should be operated at a controlled temperature and the beds are desorbed with the assistance of a hot purge gas at up to 300° F.

In U.S. Pat. No. 2,810,454 oxygen is removed from an impure argon stream by adsorption on a molecular sieve bed. The adsorption bed is refrigerated during the adsorption cycle and is heated and subjected to a purge gas during the desorption cycle.

U.S. Pat. No. 4,001,306 discloses the use of fluoramine, a dioxygen absorbent, for the separation of a product oxygen from an air stream for use in airplanes and other space limited utilities. The dioxygen absorbent bed is cooled during the absorption cycle and is heated up to 220° F. during the desorption cycle. In addition, the cycle of absorption is intermittently interrupted to heat the absorption beds to a high 390° F. temperature to volatilize inerts captured in the absorbent. A purge of air or nitrogen is utilized to remove the latter inerts.

In U.S. Pat. No. 4,239,509, a molecular sieve absorbent is utilized to remove nitrogen and oxygen from an argon stream.

Additional patents of general interest to the subject invention include: U.S. Pat. Nos. 2,874,030; 2,909,410; 3,055,732; 3,361,531; 3,969,481; 3,986,849; 3,966,028; 4,025,605; 4,077,780; 4,194,892; 4,203,958; 4,234,322; and 4,299,719.

The prior art processes for removing minor or trace quantities of oxygen from impure inert gas streams, such as argon or nitrogen, via chemical complexing or absorption suffer from the problems of expensive and complex separation systems an energy intensive regulation by refrigeration or heating of the absorbent at various stages of the process cycle for removing oxygen from inert gas streams. The present invention overcomes such drawbacks of the prior art.

BRIEF SUMMARY OF THE INVENTION

The present invention comprises a process for the removal of minor or trace amounts of oxygen from an oxygen containing impure inert gas stream to produce an inert gas stream of reduced oxygen content. Relevant gas streams include argon or nitrogen which are contaminated with oxygen. The process involves the absorption of the oxygen from the inert gas stream on a dioxygen absorbent in a plurality of absorbent beds, in an adiabatic pressure swing process. During the absorption step on a particular dioxygen absorbent bed, the absorbent temperature is allowed to rise adiabatically due to the exothermic heat of absorption, but the absorption step is terminated short of oxygen breakthrough from the bed. The heat stored in the absorbent is then utilized to assist in the desorption of the dioxygen absorbent bed when the gas stream is switched to another in the plurality of beds utilized in the process during the desorption step of said absorbent bed. Desorption is effected by depressurization, and additionally by the stored heat and vacuum pumping in order to remove essentially all the oxygen from the dioxygen absorbent. Alternately, a purge gas of inert gas and preferably the inert gas being cleansed in the process, is used to promote in the desorption cycle of any one of the particular absorbent beds undergoing desorption.

Preferably, the dioxygen absorbent may contain a high capacity additive such as particulate metal, in order to further increase the heat capacity of the absorbent bed.

The dioxygen absorbent is a chealte comprising a central metal atom surrounded by various organic constituents, the entire molecule of which can bond reversibly without interfering or breaking the oxygen to oxygen interbond of the gas molecule.

Preferably the dioxygen compound is selected from a cobalt chelate, such as Salcomine or fluoramine.

It is an advantage of the present invention to perform such an oxygen removal from an inert gas stream in a simple and economic process.

It is a further advantage of the present invention to remove oxygen from such inert gas streams in an energy efficient manner without the need for refrigeration or the external heating of the separation system.

It is an advantage of the present invention to perform the separation and removal of oxygen from impure oxygen containing inert gas streams in an adiabatic pressure swing process.

It is yet a further advantage of the present invention to utilize an adiabatic pressure swing absorption process for the removal of trace oxygen from inert gas streams wherein absorption beds are desorbed with the assistance of an inert purge gas stream.

DETAILED DESCRIPTION OF THE INVENTION

Figure 1:
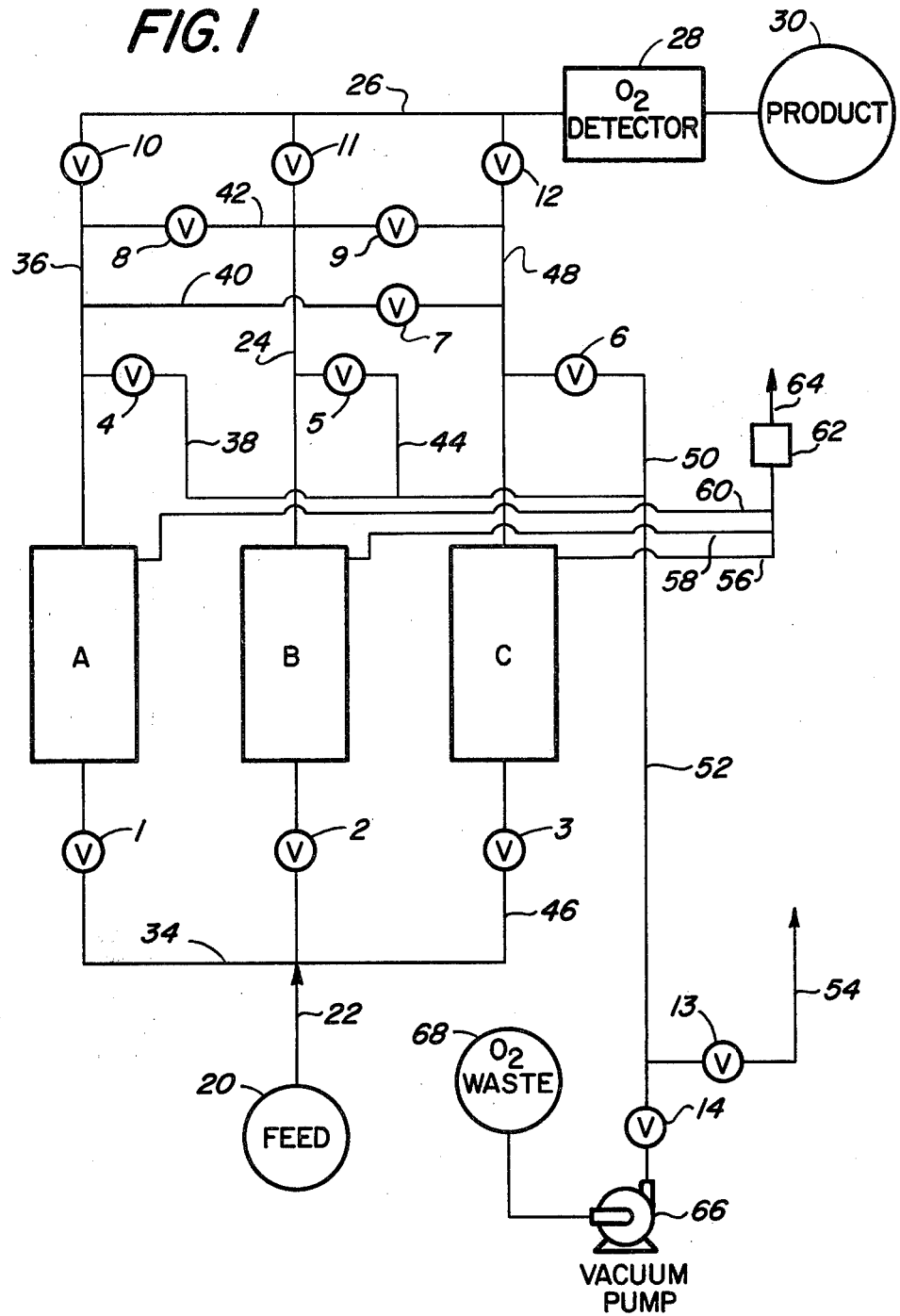
FIG. 1 represents a schematic flow scheme of the preferred embodiment of the subject adiabatic pressure swing absorption process.

The present invention will now be described in greater detail with reference to the drawings identified above. In FIG. 1, three absorbent beds A, B and C are utilized in the preferred embodiment. However, the invention can be contemplated with two or more beds and the exact number will depend upon the flow rate of the gas, as well as the desired amount of capital investment. The dioxygen absorbent is packed in a particulate form within each of the several absorbent beds.

The dioxygen absorbent consists of a transition metal complex in a chelate structure which can reversibly and exothermically bind gaseous oxygen wherein the oxygen to oxygen bond is preserved. Within the scope of this invention, the dioxygen chelate terminology refers to those solid Group III–VIII transition metal oxygen carriers or chelates that specifically bind oxygen to form a dioxygen complex. In other words, the chelate prior to its absorption of oxygen does not contain the two bonded oxygens which give it its dioxygen nomenclature. After absorption of oxygen gas onto the chelate, a true dioxygen chemical complex exists in which the oxygen would be bound in one or more of the following forms:

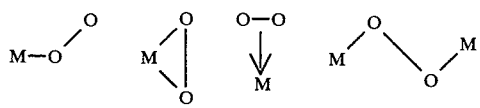

The dioxygen chelates, depending upon their structure, can be utilized as particulate solids themselves or as liquids formulated with an inert carrier or packing. Two particularly preferred dioxygen chelates forming a complex with the metal cobalt are salcomine and fluoramine. This chemically reversible absorption is illustrated by the following cobalt chelate;

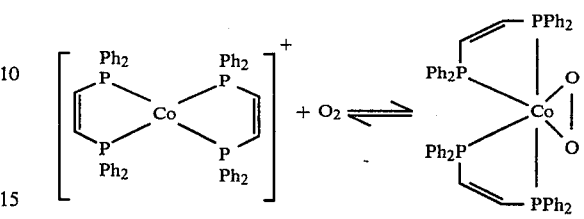

Table 1 identifies a number of other dioxygen chelate complexes which can be utilized as the absorbent in the process of the present invention. Such compounds are further defined in J. E. Lyons, "Transition Metal Complexes As Catalysts For The Addition Of Oxygen To Reactive Organic Substrates", in *Aspects of Homogeneous Catalysis*, R. Ugo (Ed.) Volume 3, Reidel, Boston.

TABLE 1

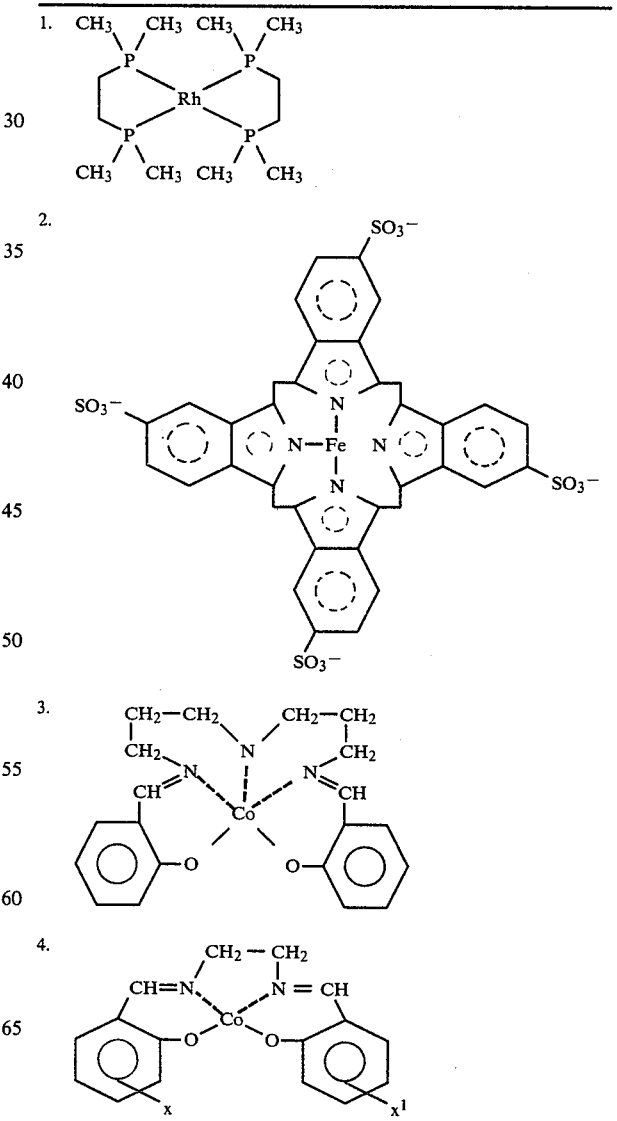

TABLE 1-continued where x and/or $x^1$ = F, H, $CH_3CH_2O$, or $CH_3O$

5. 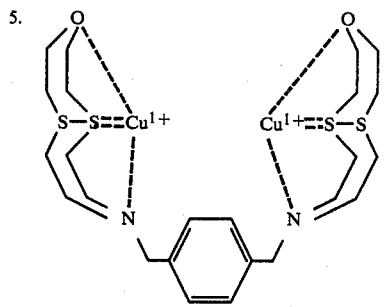

which is equivalent to $(L\ Cu_2)^{2+}$
where L = 1,4-bis-(1-oxa-4,10-dithia-7-azacyclododecan-7-ylmethyl) benzene 6. $(Mo^{II})_2$* $SiO_2$
   *covalently bonded
7. iron porphyrin, when bound to polymers such as polystyrene In order to insure sufficient heat capacity in the beds of dioxygen absorbent, it is possible to add an inert material to locally dissipate heat from the chelate and store the exothermic heat of reaction generated during absorption. Beneficial inert materials have a high heat capacity, such as copper fillings or particulate aluminum oxide ($Al_2O_3$). The inert high heat capacity material may be mixed with the dioxygen complex in a predetermined proportion so as to limit the temperature rise of the dioxygen complex during an absorption cycle. The dioxygen complex can be physically supported on the inert high heat capacity material. This is particularly beneficial in the case of a liquid dioxygen complex which needs to be absorbed itself on a carrier particle. The carrier particle can do double duty as a carrier as well as a heat capacity agent. Alternately, the heat capacity material could be mixed with the dioxygen complex and encapsulated or bonded in an integral system using appropriate polymer materials.

In contrast to the isothermal systems of the prior art wherein the proscribed temperature of an absorption bed is controlled by external heat exchange, the present invention allows for non-isothermal operation within a prescribed temperature rise, which is a function of the total heat of absorption of oxygen onto dioxygen complexes during an absorption step, the mass and heat capacity of the absorbent and the heat of desorption during a desorption step. The stream flow rate, the oxygen partial pressure of the feed, the desired product streams and the quantity of oxygen to be absorbed at a given quantity of flow, dictate the total heat generated in any particular absorbent bed which is on stream. By avoiding mechanical control of temperature in the reactor, the system is simplified considerably as to apparatus and operation. The system of the present invention is controlled simply by the feed gas stream entering the absorbent beds and oxygen breakthrough characteristics. Before oxygen breakthrough in the exit stream of the absorbent bed is reached, the feed is cut off to that particular absorbent bed and is redirected to another bed connected in parallel to the first bed into which the feed stream is then directed. Continuous removal of an essentially oxygen free inert gas stream is made from the system. The detection of oxygen breakthrough and the switching of feed stream flow from bed to bed is the only substantial control that is necessary in the adiabatic pressure swing process of the present system utilizing the dioxygen chelate comprises identified above. However, at initial startup it may be necessary, depending on the particular dioxygen complex, to begin the cycle for each bed at subambient temperature by introducing a subambient feed or a low temperature purge gas. This is only contemplated at initial startup.

In order for the adiabatic system of the present invention to operate without permanently degrading the dioxygen complex due to high temperatures achieved by heat evolved during absorption, the absorption beds must be designed with respect to the isotherms of the dioxygen complex intended for use. Exemplary of the selection of the proper operating parameters for a system of the present invention is the following discussion concerning Fluoramine.

Figure 3:
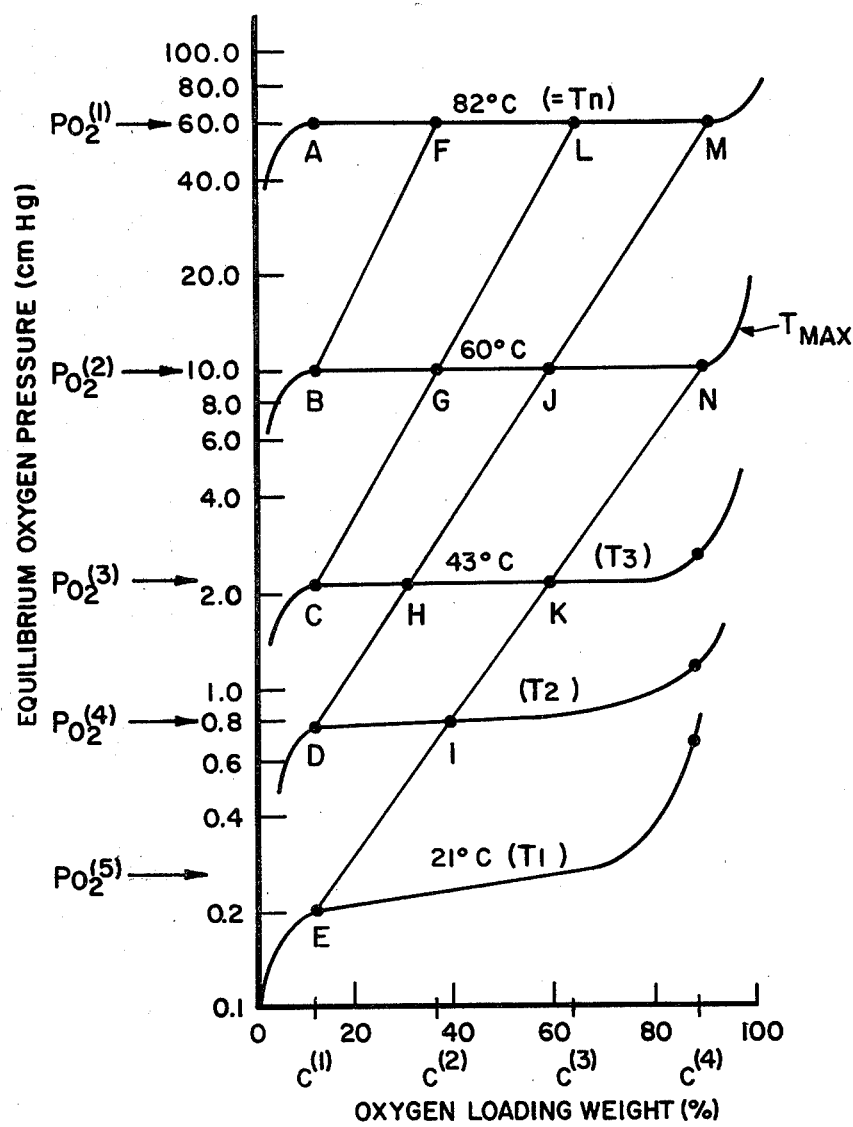
FIG. 3 is a graph of the equilibrium isotherms for Fluoramine.

A family of equilibrium isotherms for the Fluoramine/$O_2$ system are shown in FIG. 3. The isotherm label $T_{max}$ (60° C.) represents a reasonable value for the maximum allowable temperature for Fluoramine.

An adiabatic pressure swing path is defined as a straight line connecting two isotherms, for example paths EN, DH, DJ, and BF. Oxygen absorption proceeds along the adiabatic path, in the direction of increasing temperature and oxygen pressure; the converse is true for oxygen desorption. The two end points of the adiabatic path are important for two reasons:

(a) The starting point (i.e., pts E, D, C, B) establishes the level of oxygen removal or purity of the effluent stream, since the oxygen concentration of the effluent stream cannot be less than the oxygen partial pressure in equilibrium with the complex at the starting point (i.e., E, D). For example, with a starting point of D, the $O_2$ purity of the effluent stream is approximately $PO_2^{(4)}/P_T$, where $P_T$ is the pressure of the effluent stream. Therefore, the requirement for a higher level of oxygen removal dictates that the cycle be started at a correspondingly lower isotherm (and/or oxygen pressure)(i.e., D-E).

(b) The end-point (i.e., G, J, L, M) of the adiabatic path establishes the upper temperature of the system, a temperature that must be below the "maximum allowable temperature" of the complex for reasons discussed above. The Fluoramine, endpoints F, L, and M represent unfavorable conditions leading to thermal degradation of the complex, whereas points H and K lie well below the maximum allowable temperature. Points G, J, and N lie on the isotherm corresponding to the maximum allowable temperature. Depending on the difference between the maximum allowable temperature and the actual degradation temperature, points G, J, and N may represent a set of practical conditions or one to be avoided. Clearly, path BF is not workable. There are two means for adjusting the actual end-point of the adiabatic path.

1. The actual end-point lies on (or below) the isotherm in equilibrium with the oxygen pressure of the feed. For example, with an oxygen pressure of $PO_2^{(1)}$ in the feed, the end-point would lie along isotherm $T_n$. The end-point would lie along $T_{max}$ for an oxygen pressure of $PO_2^{(2)}$ in the feed. Therefore, low pressure and/or oxygen lean streams lead to lower end-point temperatures. In some cases, the feed pressure may be reduced to avoid an excessive end-point temperature.

2. The slope of the adiabatic line can be decreased through the addition of inert ballast. Such ballast acts as a sink for the heat of reaction, thereby protecting the system from being subjected to excessive temperatures. For example, starting at point C (of FIG. 1) for a feed partial pressure of $PO_2^{(2)}$, point G is the end-point. However, the capacity of the complex is only $C^{(2)}$-$C^{(1)}$. Starting with point C, the $O_2$ capacity of the complex can be increased in two ways: (a) adding inert ballast to shift the end-point to N on isotherm $T_{max}$, which yields an increased capacity of $C^{(4)}$-$C^{(1)}$; and (b) exposing the system to an increased $O_2$ pressure $PO_2^{(1)}$, yielding end-point L and capacity $C^{(3)}$-$C^{(1)}$, but leading to thermal degradation ($T_n > T_{max}$).

It is worth noting that with an end-point of N, further increases in the $O_2$ partial pressure of the feed will not raise the temperature of the system above $T_{max}$ since the complex at N is essentially saturated with $O_2$ and no absorption can occur. The system increases isothermally towards point M, with minor heat evolution. Therefore, adiabatic paths that end at the so-called "$O_2$ saturation point" represent cycles that advantageously tolerate increases (fluctuations) to the oxygen feed pressure, such as might occur in practice, without leading to degradation of the complex.

Therefore, the upper end-point for a given complex can be controlled by (1) adjusting the feed pressure, if necessary, and/or (2) introducing a heat sink, inert filler, into the complex. The lower-end of the cycle is fixed by the purity requirements of the particular application. In those cases requiring rigorous removal of oxygen from relatively dilute (oxygen-lean) streams, such as the application involving purification of a crude argon stream, an inert filter is not required since the temperatures of the two end-points lie well below $T_{max}$.

In addition to the usual advantages of absorption base processes, the unique advantages of the subject invention are that no external heat exchange is required since the process is operated in an adiabatic mode, with the heat generated in the exothermic oxygen absorption step stored for subsequent use in the endothermic oxygen desorption step. The process can be operated on a rapid cycle, since $O_2$ absorption/desorption are controlled by mass-transfer and not heat transfer considerations. Thermal excursions during the adiabatic cycle can be controlled to within prescribed limits to ensure that the temperature of the complex does not exceed the "maximum allowable temperature" of the complex.

With reference to FIG. 1, the manner of operation of the preferred embodiment of the present invention will now be described. The process will be described with regard to an argon gas stream, however it is contemplated that the invention is equally relevant to other inert gas streams, such as oxygen-containing nitrogen streams. An impure argon stream containing 95 to 97% argon with the remaining content of the gas stream being oxygen is the typical off stream from a cryogenic air separation system. Such a gas mixture would be the typical feed for the system of the present invention. This impure argon gas stream is introduced from a source 20, shown in FIG. 1, through line 22. By the appropriate opening of valves 1, 2 or 3 and the utilization of branch lines 34 and 46, the impure argon feed stream can be directed to one of three absorbent beds A, B or C. In each of these absorbent beds, a dioxygen absorbent material is placed in either an unsupported or a supported manner and in conjunction with a high heat capacity material or optionally without such a heat capacity material. Before start up, if the feed is not at subambient conditions, it may be beneficial to precool each bed with a subambient temperature purging gas. This can be accomplished using a standard gas refrigeration loop or another gas stream within the processing site. For example, argon or nitrogen can be introduced into the beds and vaporized to achieve subambient temperature. This procedure is only done at initial start up.

In the event that valve 1 is opened and valve 2 and 3 are closed, the feed stream will proceed through line 22 and line 34 and pass through absorbent bed A. During passage of the impure argon stream through the absorbent bed A, oxygen is chemically absorbed onto the metal chelate which is packed in said bed and during this absorption the chelate becomes a dioxygen complex or compound. During the absorption of oxygen from the argon stream the absorbent bed is elevated in temperature due to the exothermic heat of absorption. This rise in temperature is allowed to proceed during the full duration of the absorption step in order that an adiabatic absorption occurs without the need to extract energy. The nature of the absorption with dioxygen complex forming metal chelates is such that even trace amounts of oxygen exemplary of the 3 to 5% oxygen found in the feed argon stream are removed substantially completely from the argon stream. Therefore, an argon product is removed from the down stream end of the absorbent bed having a purity of 99.999%. Such purities are impractical to obtain with physical adsorption systems.

The pure argon stream exits through line 36 and open valve 10. It proceeds to product storage through line 26 and passes oxygen guard detector 28 before going to storage 30. A portion of the pure argon product of the product stream in line 36 is removed in a side stream 42 and passes through open valve 8 to pressurize bed B. Valve 8 is open for only a portion of the absorption step of bed A sufficient to pressurize bed B and then valve 8 is closed. Absorption in absorbent bed A continues until before oxygen breakthrough occurs at the down stream end of said absorbent bed. Preferably, the absorbent beds are sized and appropriately packed with high heat capacity material such that the switching from a particular absorbing bed is dictated only by the approach of oxygen breakthrough and not by the achievement of a maximum temperature to which the dioxygen compound can be exposed.

When oxygen is detected in an oxygen switching sensor 62 fed by a slipstream in line 60, the system is switched to a subsequent absorbent bed by the appropriate control of valves. In this case, valve 1 would be closed and valve 2 would be opened. The impure argon feed stream would then pass through absorbent bed B for the removal of its oxygen content. At the same time absorbent bed A would undergo depressurization through open valve 4 and line 38 and 52. The exothermic heat of oxygen absorption generated during the absorption step and stored in the dioxygen complex absorbent provides the energy necessary for the endothermic desorption of the oxygen from the complex. During oxygen desorption, the temperature of the absorbent decreases. At the end of the desorption step, the temperature of the absorbent has been returned to its starting (initial) value. The operation of the system is adiabatic in that the endothermic heat of oxygen desorption is equal to exothermic heat of oxygen absorption. Therefore, no external heat sources or heat sinks are required. As absorption in bed B continues, absorbent bed A may optionally be subjected to vacuum pumping by pump 66 depending on the specific oxygen concentration sought in the final product. Depressurization is controlled by valve 13 which discharges through vent 54, while vacuum pumping is controlled thereafter by valve 14, pump 66 and vent 68. Also during the absorption cycle in bed B, a portion of the pure argon product in line 24 is diverted by the open valve 9 and line 48 for the pressurization of absorbent bed C which will go on line in the sequence after absorbent bed B nears oxygen breakthrough. The main quantity of the pure argon product is passed through open valve 11 and line 26 to argon storage 30.

At or before oxygen breakthrough in absorbent bed B which is determined by sensor 62 fed by a slipstream in line 58, valve 2 is closed, valve 1 remains closed and valve 3 is open such that the impure argon feed passes through line 46 and the oxygen content of that stream is absorbed in the absorbent bed C. The pure argon product is passed through line 48 and opened valve 12 to the oxygen guard detector 28 and lastly to the argon product storage 30. A portion of the argon product passes through line 40 and opened valve 7 to repressurize absorbent bed A in order to prepare it for the next absorption step when oxygen breakthrough is about to occur in now absorbing bed C. Again the switch is determined by oxygen sensing in sensor 62 supplied by a slipstream in line 56. The slipstream is vented in line 64. During this time, absorbent bed B, which has just gone off line, is depressurized by the closing of valve 11 and the opening of valve 5. Argon and predominently oxygen are depressurized from bed B through line 44 and 52 and passed through open valve 13 to vent 54. Subsequently after ambient pressure is attained, valve 13 is closed and valve 14 is opened in order to vacuum desorb any residual oxygen from absorbent bed B by pump 66. Thus oxygen is removed by the driving force of simple depressurization of the bed in which equilibrium favors desorption wherein the endothermic heat of desorption is supplied by the heat of absorption which has been generated during absorption in bed B. In this manner, the absorption and desorption steps constitute an adiabatic, low-energy, process cycle.

The full step and valve sequence for the adiabatic pressure swing process of FIG. 1 is shown in Table 2. From a review of FIG. 1 and Table 2, the simultaneous operation of absorption, desorption and pressurization is demonstrated. Potentially, an adiabatic pressure swing process as disclosed above could be achieved utilizing from two to any plurality of beds which is manageable and prudent with respect to capital investment. The three bed configuration of the present embodiment is the preferred mode of operation, but the utilization of a dioxygen absorbent with an adiabatic pressure swing absorption sequence is not limited to any precise number of absorbent beds.

TABLE 2

STEP/VALVE SEQUENCE FOR ONE ABSORPTION/DESORPTION CYCLE

| Step | Valve Positions |
|---|---|
| A1 (Absorption) B3 (Pressurization) | Open - 1, 6, 8, 10, 13 |
| C2 (Desorption) | Closed - 2, 3, 4, 5, 7, 9, 11, 12, 14 |
| A1 (Absorption) | Open - 1, 6, 10, 14 |
| C2 (Desorption) | Closed - 2, 3, 4, 5, 7, 8, 9, 11, 12, 13 |
| A2 (Desorption) B1 (Absorption) | Open - 2, 4, 9, 11, 13 |
| C3 (Pressurization) | Closed - 1, 3, 5, 6, 7, 8, 10, 12, 14 |

TABLE 2-continued

STEP/VALVE SEQUENCE FOR ONE ABSORPTION/DESORPTION CYCLE

| A2 (Desorption) | Open - 2, 4, 11, 14 |
|---|---|
| B1 (Absorption) | Closed - 1, 3, 5, 6, 7, 8, 9, 10, 12, 13 |
| A3 (Pressurization) B2 (Desorption) | Open - 3, 5, 7, 12, 13 |
| C1 (Absorption) | Closed - 1, 2, 4, 6, 8, 9, 10, 11, 14 |
| B2 (Desorption) | Open - 3, 5, 12, 14 |
| C1 (Absorption) REPEAT | Closed - 1, 2, 4, 6, 7, 8, 9, 10, 11, 13 |

| Key | | | |
|---|---|---|---|
| | | STEP | |
| | A1 | A2 | A3 |
| A | B3 | B1 | B2 |
| B | C2 | C3 | C1 |
| C | | | |

1 - O₂ Absorption
2 - O₂ Desorption
3 - Ar Pressurization

Figure 2:
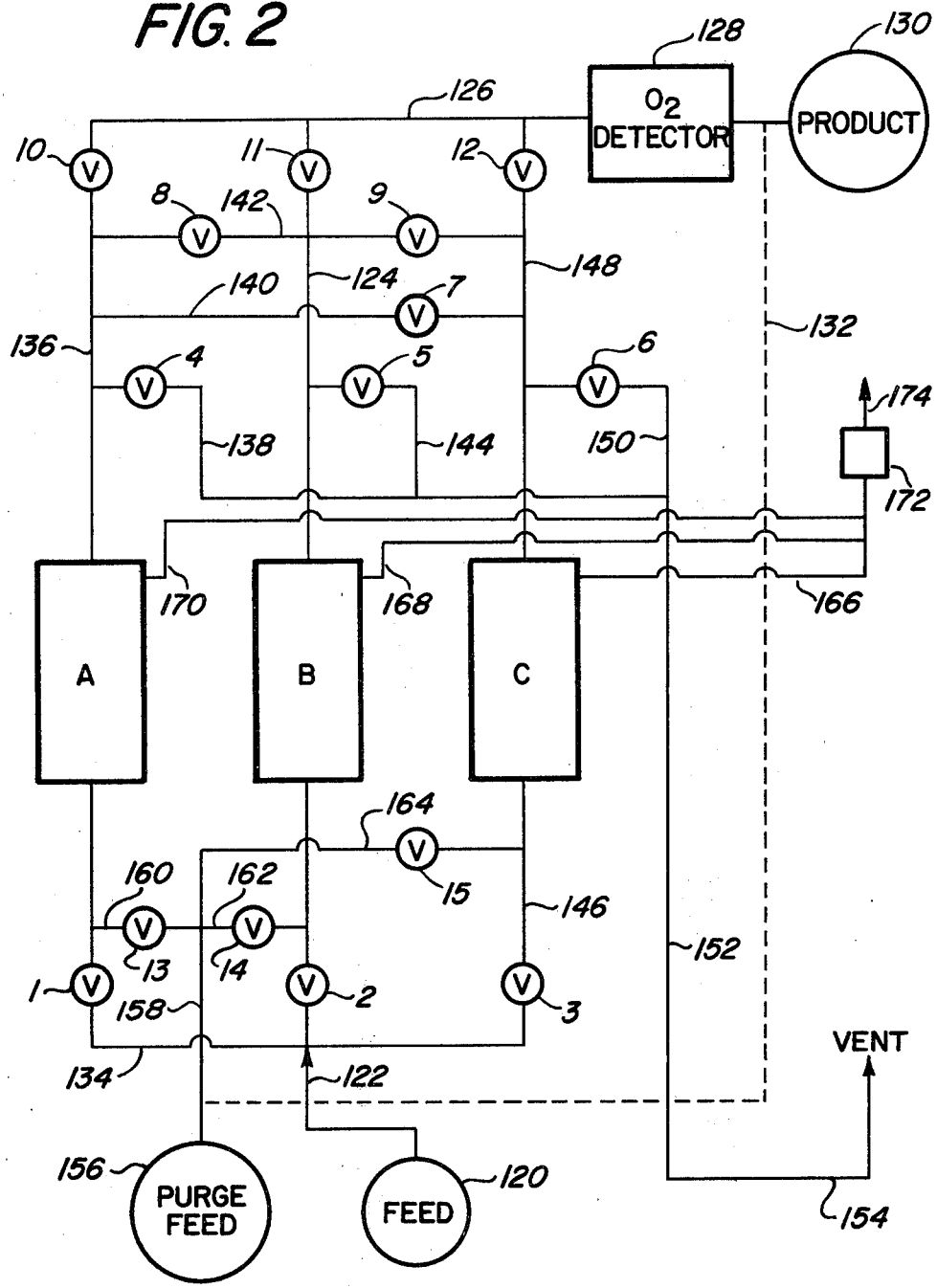
FIG. 2 represents a schematic flow scheme of an alternate embodimemt of the subject adiabatic pressure swing absorption process utilizing a purge gas for the desorption cycle.

An alternate embodiment of the present invention involves the use of an inert purge gas to effect further desorption of oxygen from the dioxygen chelate complex containing absorbent beds following the termination of the absorption step. Such a purge embodiment is illustrated in FIG. 2. Again, the system will be described with respect to an impure oxygen-containing argon gas stream. However, as stated before, other inert gas streams are contemplated for purification in the process of the present invention and this description should not be deemed to be a limitation on the particular inert gas stream which may be purified of minor or trace amounts of oxygen contamination. With respect to FIG. 2, an impure oxygen-containing argon stream from a source such as a cryogenic air separation unit 120 is introduced into a three absorbent bed separation system. The impure argon stream enters the system in line 122. The flow of the argon stream is directed into one of the three absorbent beds A, B or C by valves 1, 2 or 3. To absorb oxygen from the impure argon stream in absorbent bed A, valve 1 is opened while valve 2 and 3 are closed such that the argon stream passes through line 134 and enters bed A. Oxygen is absorbed from the argon stream on the metal chelate absorbent which is transformed into a dioxygen complex upon such absorption. As before, the heat of absorption is allowed to remain in the absorption bed, thereby raising the absorbent temperature during the course of the absorption such that the absorption is conducted in an adiabatic manner. The capacity of the bed to absorb and store such heat without thermal degradation of the absorbent can be supplemented by the inclusion of high heat capacity materials such as copper filings or aluminum oxide particles as outlined above. An essentially pure argon product stream is removed from the down stream portion of bed A through line 136 and open valve 10. The stream continues in line 126 through an oxygen guard device 128 and goes to product storage 130. The detector is utilized to safeguard against oxygen contamination of the product. An oxygen sensor 172 determines when to switch from bed A to bed B by detecting the presence of oxygen in a slipstream from the bed taken from line 170. The stream is then vented in line 174. During the absorption cycle in bed A, valve 8 can be opened in order that a repressurizing quantity of product gas can flow through line 142 and line 124 into bed B which is being readied for absorption duty in the sequence of the adiabatic pressure swing absorption step.

When oxygen breakthrough occurs or slightly before such breakthrough occurs, valves 1, 8 and 10 are closed and the feed stream in line 122 is introduced into the second absorbent bed B by opening valve 2. Absorption of oxygen then commences in bed B and an essentially oxygen-free argon product stream is removed in line 124 through now open valve 11 and line 126. A small portion of the argon product in line 124 can be diverted through now open valve 9 and line 148 in order to pressurize bed C to the pressure of the feed stream in order to ready it for the switch in sequence of absorption from bed B to bed C. During this time valve 4 is opened and the pressurized gas remaining in bed A is vented through line 138 and 152 to a convenient discharge point 154. This venting removes a portion of the absorbed oxygen existing as a dioxygen complex in the metal chelate absorbent. The driving force for this removal makes use of the retained heat of absorption. Which is generated and accumulated during the absorption cycle, and the reduction of the oxygen partial pressure as venting progresses. However, in order to more completely desorb oxygen from the absorbent bed and, more particularly, from the metal chelate compound, it has been found that a purge of an oxygen-free inert gas stream is beneficial. This oxygen-free inert gas purge stream is conducted from any suitable source 156 through line 158 and open valve 13. The gas then passes through the absorbent bed A and further desorbs oxygen due to the dropping partial pressure of oxygen as the purge gas passes through the bed. The now oxygen-contaminated purge gas is vented through open valve 4 and the vent flow path consisting of line 138, 152 and 154. As shown in FIG. 2 the inert purge gas may optionally be a portion of the product stream in line 126. In this case as oxygen free inert gas, being argon in this example, is bypassed from line 126 through line 132 and fed to the various purge lines 160, 162 and 164.

When oxygen breakthrough or preferably just before oxygen breakthrough occurs in absorbent bed B, the valve 2 is closed as well as valve 11 and 9. The approach of oxygen breakthrough is determined in sensor 172 analyzing a slipstream in line 168. The impure argon feed stream in line 122 is then conducted through valve 3 which is switched to the open position and line 146, wherein the oxygen from the feed stream is then absorbed on the metal chelate absorbent in absorbent bed C. The oxygen-free argon product is removed in line 148 and line 126 to product storage 130. Valve 7 is opened in order to utilize a portion of the argon product to repressurize absorbent bed A via line 140 and 136. This places absorbent bed A in condition for the continuation of the absorption cycle sequence, wherein as bed C is about to experience oxygen breakthrough, the feed stream may be switched to bed A for continuation of the cyclic process. Absorbent bed B is vented and subsequently purged in a manner similar to that described for absorbent bed A. Likewise, when absorbent bed C is taken off-line and the feed stream is switched to absorbent bed A, then absorbent bed C will be vented and purged in the same fashion as described for beds A and B. Shutdown of bed C is determined by sensor 172 fed by a slipstream in line 166.

The full sequence of valve actuation and sequential flow path of the various gas stream is summarized in Table 3. As identified in that table, a three step sequence of absorption, pressurization and desorption/purge is performed in a set sequence on each bed in its own turn.

TABLE 3

STEP SEQUENCE FOR ABSORPTION/DESORPTION (PURGE) CYCLE
(Three Bed Configuration)

| Step | | Valve Positions |
|---|---|---|
| A1 | (Absorption) | Open - 1, 6, 8, 10, 15 |
| B3 | (Pressurization) | |
| C2 | (Desorption/Purge) | Closed - 2, 3, 4, 5, 7, 9, 11, 12, 13, 14 |
| A1 | (Absorption) | Open - 1, 6, 10, 15 |
| C2 | (Desorption/Purge) | Closed - 2, 3, 4, 5, 7, 8, 9, 11, 12, 13, 14 |
| A2 | (Desorption/Purge) | Open - 2, 4, 9, 11, 13 |
| B1 | (Absorption) | |
| C3 | (Pressurization) | Closed - 1, 3, 5, 6, 7, 8, 10, 12, 14, 15 |
| A2 | (Desorption/Purge) | Open - 2, 4, 11, 13 |
| B1 | (Absorption) | Closed - 1, 3, 5, 6, 7, 8, 9, 10, 12, 14, 15 |
| A3 | (Pressurization) | Open - 3, 5, 7, 12, 14 |
| B2 | (Desorption/Purge) | |
| C1 | (Absorption) | Closed - 1, 2, 4, 6, 8, 9, 10, 11, 13, 15 |
| B2 | (Desorption/Purge) | Open - 3, 5, 12, 14 |
| C1 | (Absorption) | Closed - 1, 2, 4, 6, 7, 8, 9, 10, 11, 13, 15 |
| REPEAT | | |

Key

| | STEP | | |
|---|---|---|---|
| A | A1 | A2 | A3 |
| B | B3 | B1 | B2 |
| C | C2 | C3 | C1 |

1 - O$_2$ Absorption
2 - Desorption/Purge
3 - Ar Pressurization

The invention process has been set forth using a three bed configuration as shown in FIG. 1 and FIG. 2. Other multiple bed configurations can be contemplated and these will alter some aspects of the operation, such as cycle time and the overall sequence of bed operation, but the novel use of a dioxygen chelate in an adiabatic pressure swing process will still be achieved as demonstrated above. The important aspect of this invention is the use of packed beds connected in parallel, which beds contain dioxygen complex forming metal chelates, that is, dioxygen precursor metal chelates which in the presence of oxygen are converted to dioxygen complexes or compounds, wherein one bed is undergoing adiabatic absorption while another bed is undergoing adiabatic desorption, optionally with purging during such desorption cycle. An important aspect of the invention is the passage of the oxygen-containing impure inert gas streams through the packed bed of the system in an absorption step wherein the absorption is conducted without any energy removal until oxygen breakthrough occurs or just prior to such breakthrough. The temperature of the absorption bed is allowed to rise due to the exothermic nature of the oxygen absorption, which is manifested by the chemical reaction of the precursor converting to the dioxygen complex in which oxygen is bound chemically to the metal chelate. The desorption step also lacks the need for any exterior energy input in that it is performed by the equilibria driving force of depressurization and the inherent heat buildup which is available from the exothermic absorption to drive the desorption which is endothermic. The use of an inert purge gas further drives the equilibrium of the oxygen/dioxygen complex to the desorbed state by lowering the partial pressure of oxygen in equilibrium with the complex which favors the desorption of oxygen.

The novel absorption and purification system of the present invention is contemplated for the removal of minor levels of oxygen from inert gas streams. An exemplary gas stream which would benefit from this system is the argon stream extracted in a typical cryogenic air separation unit. However, other oxygen-contaminated inert gas streams could also be processed through the system of the present invention. The feed gas which can be introduced into the system of the present invention should have an oxygen partial pressure or concentration which is sufficiently low such that the equilibrium temperature of the complex corresponding to the oxygen partial pressure of the feed is less than the maximum temperature limit of the particular dioxygen complex in the absorbent bed which is used. The temperature of the feed gas stream can be at ambient temperature conditions, but ideally a gas feed stream at subambient temperatures would allow for greater bed temperature rise and therefore minimize the necessary volume of the bed and the requirement for a high heat capacity additive to the bed. In the case of processing argon streams emanating from a cryogenic air separation unit, such subambient feed streams are possible without any additional energy requirements. Therefore, in those cases where subambient feed streams are readily available without further processing, such streams are desirably processed at subambient temperatures. This should not be construed to mean that ambient temperature flow streams cannot be processed, but it does require external precooling or a larger bed volume and the utilization of high heat capacity materials that are mixed with the dioxygen complex absorbent.

The present invention provides a low energy, low capital expense process for the rigorous removal of minor amounts of oxygen from inert gas streams. The novel combination of a metal chelate, dioxygen-forming adsorbent in conjunction with an adiabatic pressure swing process sequence provides a practical way to remove minor or trace amounts of oxygen from inert gas streams which will be utilized in applications where oxygen cannot exist in even minor proportions. The invention has been specifically described with reference to the production of an essentially pure argon product. However, other inert oxygen-free gases can also be produced in this process from gases having minor proportions of oxygen contamination. Therefore, the scope of the invention should not be deemed to be limited by the specific descriptions utilized above, but rather the scope of the invention should be ascertained from the claims which follow.

We claim:

1. A process for removing oxygen from an oxygen-containing inert gas stream by absorption of the oxygen into a dioxygen absorbent in an adiabatic pressure swing absorption process wherein the process is designed to operate below the temperature of decomposition of the absorbent, comprising the steps of:
   (a) introducing an oxygen-containing inert gas stream into a first bed of a dioxygen absorbent at a temperature on the isotherm of the particular absorbent which will allow for adiabatic absorption without degradation of the absorbent;
   (b) adiabatically absorbing the oxygen content of said insert gas stream of said dioxygen absorbent, while removing an essentially oxygen-free inert gas from said bed;
   (c) terminating said absorption on said first bed before oxygen breakthrough in said bed;
   (d) switching the flow of the inert gas stream to a second dioxygen absorbent bed for adiabatic absorption of the oxygen content of said stream while removing an essentially oxygen-free inert gas from said bed;
   (e) desorbing said first bed adiabatically by reducing the pressure in said bed and by utilizing the heat of absorption to drive absorbed oxygen off of said dioxygen absorbent;
   (f) repressurizing said first bed with essentially pure oxygen-free inert gas from the downstream flow of product gas from said second bed;
   (g) terminating said absorption on said second bed before oxygen breakthrough in said bed;
   (h) switching the flow of the inert gas stream back to the first dioxygen absorbent bed, while desorbing the second bed as described in step (e) above;
   (i) repressurizing the second bed with essentially pure oxygen-free inert gas from the downstream flow of product gas from said first bed;
   (j) cyclically repeating steps (a) through (i) for the production of an essentially oxygen-free inert gas.

2. The process of claim 1 wherein the inert gas stream is an argon stream contaminated with oxygen.

3. The process of claim 1 wherein the dioxygen absorbent is selected from the class comprising metal chelates of Group III-VIII metals which will bind oxygen reversibly while preserving the oxygen to oxygen bond of the gaseous oxygen.

4. The process of claim 1 wherein the dioxygen absorbent is salcomine or its derivatives.

5. The process of claim 1 wherein the absorbent beds of dioxygen chelate also contain a high heat capacity material.

6. The process of claim 5 wherein the high heat capacity additive is selected from the group comprising particulate copper and particulate alumina.

7. The process of claim 5 wherein the dioxygen absorbent and the heat capacity additive are provided in the absorbent beds in simple admixture.

8. The process of claim 5 wherein the dioxygen absorbent is physically supported on the heat capacity material in the absorbent bed.

9. The process of claim 5 wherein the dioxygen absorbent and the heat capacity additive are encapsulated or bonded together in a polymer matrix in said absorbent bed.

10. The process of claim 1, 2, 3, 4 or 5 including the step of desorbing the absorbent beds with the assistance of an oxygen-free purge stream of an inert gas.

11. The process of claim 10 wherein the purge stream is selected from the group comprising nitrogen and argon.

12. The process of claim 1, 2, 3, 4 or 5 wherein the absorption step within the beds is initiated at subambient temperatures with the assistance of a subambient temperature cooling fluid passed through said beds during initial startup of each bed.

13. The process of claim 10 wherein the absorption of the beds is initiated at subambient temperatures with the assistance of a subambient temperature cooling fluid passed through said beds during initial startup of each bed.

14. The process of claim 1, 2, 3, 4, or 5 wherein the desorption of oxygen from the absorbent beds is assisted by vacuum pumping of the oxygen from the desorbing bed.

15. The process of claim 11 wherein the purge stream is obtained from the product stream of the process.

16. A process for removing essentially all oxygen from a crude argon gas stream containing a minor amount of oxygen by absorption of the oxygen on a dioxygen absorbent in an adiabatic pressure swing absorption process utilizing at least three absorbent beds wherein the process is designed to operate below the temperature of decomposition of the absorbent, comprising the steps of:

(a) introducing a crude argon and oxygen gas stream into a first bed of an oxygen absorbent comprising a dioxygen compound, which chemically absorbs and desorbs oxygen reversibly, selected from the class comprising metal chelates of Group III-VIII metals which bind oxygen while preserving the oxygen to oxygen bond at a temperature on the isotherm of the particular absorbent which will allow for adiabatic absorption without degradation of the absorbent;

(b) adiabatically absorbing essentially the entire oxygen content of said crude stream on said absorbent in said first bed, while removing a pure argon stream from said bed as a product stream;

(c) pressurizing a second dioxygen absorbent containing bed with pure argon gas from said product stream;

(d) terminating said absorption on said first bed before oxygen breakthrough;

(e) switching the flow of crude argon to said second dioxygen absorbent containing bed for adiabatic absorption of the oxygen content of said crude argon, while removing a pure product argon stream from said second bed;

(f) desorbing said first bed by reducing the pressure in said bed, utilizing the heat of absorption built up in said bed to provide for the endothermic heat of oxygen desorption to drive absorbed oxygen off of the dioxygen absorbent;

(g) pressurizing a third dioxygen absorbent containing bed with pure argon gas from the product stream of said second bed;

(h) switching the flow of crude argon to said third bed for adiabatic absorption of oxygen and removal of a pure argon product from said bed, while desorbing said second bed as set forth in step (f) above and repressurizing said first bed as set forth in step (g) with the product from the third bed;

(i) repeating the preceding sequence for continuous argon-oxygen separation.

17. The process of claim 16 wherein an inert purge gas is used to assist the desorption of oxygen from the dioxygen absorbent containing beds.

18. The process of claim 17 wherein the inert purge gas is selected from the group consisting of nitrogen and argon.

19. The process of claim 17 wherein the inert purge gas is argon obtained from the product argon gas stream.

* * * * *